United States Patent

[11] 3,619,460

| [72] | Inventor | Leonard Chill<br>Richmond, Calif. |
| --- | --- | --- |
| [21] | Appl. No. | 820,706 |
| [22] | Filed | Apr. 28, 1969 |
| [45] | Patented | Nov. 9, 1971 |
| [73] | Assignee | Chevron Research Company<br>San Francisco, Calif.<br>Continuation of application Ser. No.<br>648,392, June 23, 1967, now abandoned,<br>and a continuation-in-part of 552,523,<br>Mar. 24, 1966, now abandoned. |

[54] PROCESS FOR UNIAXIALLY ORIENTING POLYPROPYLENE FILMS
6 Claims, 1 Drawing Fig.

[52] U.S. Cl......................................................... 264/288,
264/210 R, 264/216
[51] Int. Cl......................................................... B29d 7/24
[50] Field of Search........................................... 264/288,
289, 210 R, 216

[56] References Cited
UNITED STATES PATENTS

| 3,214,503 | 10/1965 | Markwood.................. | 264/288 |
| --- | --- | --- | --- |

FOREIGN PATENTS

| 812,972 | 5/1959 | Great Britain............... | 264/288 |
| --- | --- | --- | --- |
| 682,937 | 3/1964 | Canada........................ | 264/288 |

Primary Examiner—Julius Frome
Assistant Examiner—Herbert Mintz
Attorneys—A. L. Snow, Frank E. Johnston and G. F. Magdeburger

ABSTRACT: Multistage process for uniaxially orienting stereoregular polypropylene film between rolls to ultimate draw ratios in the range of 6:1 up to fibrillation comprising in a first orientation stage adiabatically drawing cast film over a short linear path defined by the minimum tangential gap between a heated feed roll and a draw roll to a draw ratio of about 2:1 to 5:1 and in at least one additional orientation stage drawing the film essentially isothermally to the ultimate draw ratio over a heated roll and between the heated roll and a draw roll over a partially arcuate path defined by the arc over which the film stretches on contact with the heated roll and the minimum tangential gap between the heated roll and draw roll.

PATENTED NOV 9 1971 3,619,460
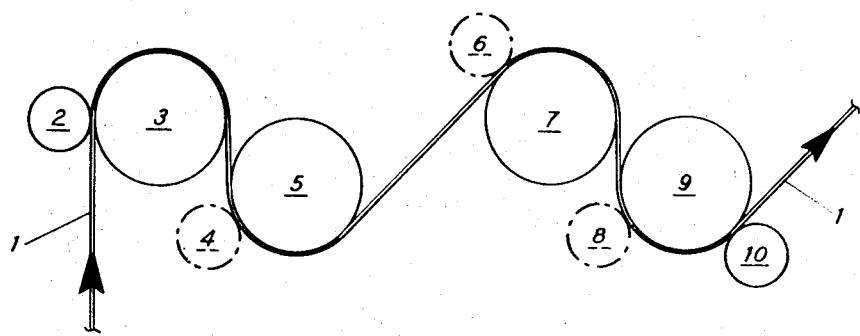
INVENTOR
LEONARD CHILL
BY P.E. Johnston
J.E. Ciotti
ATTORNEYS

PROCESS FOR UNIAXIALLY ORIENTING POLYPROPYLENE FILMS

This application is a continuation of copending application Ser. No. 648,392 filed June 23, 1967 and a continuation-in-part of application Ser. No. 552,523, filed Mar. 24, 1966 and now abandoned.

FIELD OF INVENTION

This invention relates to a novel multistage process for uniaxially orienting polypropylene films between sets of rollers having different peripheral speeds.

BACKGROUND OF INVENTION

Stereoregular polypropylene films may be oriented to give them more tensile strength in the orientation direction. One method for orienting such film is to stretch it between rollers having different peripheral speeds. By such means thin polypropylene films have been oriented uniaxially in a single step to draw ratios (ratio of peripheral speeds of rollers) up to 6:1. However, in many instances films having tensile strengths greater than those obtained by orienting to draw ratios of 6:1 or less are desirable or essential. Additional drawing may increase the tensile strength. But, if attempted in a single stretch between rolls, the additional work required to reach these higher ratios causes the film temperature to rise substantially above that desired for orienting. These high-temperatures may cause film breaks, erratic drawing, width fluctuation and low-increases in film strength. These deficiencies are especially prevalent at high-film speeds (above about 40 feet per minute casting speed).

DESCRIPTION OF INVENTION

A unique multistage process has now been found by which polypropylene film may be oriented uniaxially to ultimate draw ratios in the range of about 6:1 up to fibrillation, usually about 7:1 to 13:1 under conditions which control film temperature and the path over which the film is drawn. By this novel method film of uniform thickness in the range of 0.3 to 3.0 mils having longitudinal tensile strengths as great as 75,000 p.s.i. and even higher may be made. The process offers the additional advantage of being adaptable to wide films and high film speeds.

This novel method for orienting stereoregular polypropylene film uniaxially in the longitudinal direction to draw ratios between about 6:1 and fibrillation is done in two or more successive integral orientation stages, preferably two or three. For the higher draw ratios in this range it is desirable to use more than two stages.

The first stage involves drawing the film adiabatically over a short, linear drawspan to a draw ratio of about 2:1 to 5:1. In the following stage(s) the film is further drawn to an ultimate draw ratio in the range of about 6:1 and fibrillation. However, the following stage(s) draw is done essentially isothermally over a longer, partially arcuate path—most of the work required to orient to these ultimate ratios being done in the following stage(s).

In the first stage cast film about 2 to 20 mils thick is passed between a nip roll and a feed roll. The feed roll is internally heated to between about 200° and 280° F., preferably 260° and 280° F. Its peripheral speed is substantially equal to the casting speed—which is usually about 5 to 150 feet per minute. The contact time of the film and feed roll is sufficient to heat the film to within about 10° F. of the roll. The film is then drawn between the feed roll and a draw roll. Drawing occurs over a short linear path defined by the minimum tangential gap between the feed roll and draw roll. For conventional sized rolls, i.e., less than about 20 inch diameter, this path will usually be about 0.2 to about 3 inches long on a linear basis, more usually 0.2 to 2.0 inches long. The peripheral speed of the draw roll is about 2 to 5 times, preferably about 4 times, that of the feed roll. The draw roll temperature is maintained below about 200° F. Normally it is kept at 50° to 200° F., preferably 140° to 180° F. From this draw roll the film may be passed directly to the next following draw stage.

In the following stage the film is drawn under conditions which provide close control of the film temperature. The film first contacts a heated roll having a temperature between about 260° and 320° F., preferably 260° and 305° F. Its peripheral speed is substantially equal to that of the first stage draw roll. Contact time is sufficient to heat the film to within at least 10° F. of the heated roll. The film then passes to a draw roll having a peripheral speed sufficiently greater than the heated roll to give the desired amount of drawing. When only two orientation stages are used this will be about 1.2 to 5.0 times, preferably 2 times, that of the heated roll. Drawing is effected over a partially arcuate path at least about 6 inches long on a linear basis. The path is defined by the arc over which the film stretches in contact with the heated roll and the minimum tangential gap between the heated roll and draw roll. This arc is influenced by the heated roll temperature, diameter and surface as well as first-stage orientation conditions.

The following-stage draw roll temperature is not critical—it will usually be maintained in the range of 50° to 200° F.

The major portion of the draw in the following stage occurs while the film is in contact with the heated roll. Consequently the heat roll functions initially as a heating means and then as a "heat sink" to absorb heat generated by the drawing. In this manner film temperature is controlled during the draw.

The polypropylene film which is oriented by this process may be extruded and cast by conventional means. For instance, polypropylene may be melted at about 450° to 550° F. in an extruder having a slot die. It may then be extruded through the die at the desired speed and thickness. The extruded film may be cast by passing it over one or more internally cooled casting rolls.

The cast polypropylene film may be fed directly to the first orientation stage of this invention. The contact time of the film and the first-stage feed roll will depend upon the length of the arc over which the film contacts the roll and the casting speed. At higher casting speeds it may be difficult to get enough heat transfer from the roll to the film to bring the film to within about 10° F. of the roll. Under such conditions it may be desirable to employ auxiliary heating means to partially heat the film before it reaches the heated roll. This may be accomplished by passing the film over preheat rolls or through a heated zone, such as an oven. Likewise it may be desirable to use preheat means in conjunction with the following stage heated roll.

The film is nipped against the feed roll in the first stage so that essentially all the drawing is done in the tangential gap between the feed roll and draw roll. Since this drawing occurs quickly over a very short air gap, it is essentially adiabatic. It was found that if the film is allowed to draw over the roll as well as the air gap, erratic "necking" takes place in all stages and frequent film breaks occur in the following stage.

At high-casting speeds it may also be desirable to nip the film near its contact point with the first-stage draw roll and the following stage heated roll.

Pull rolls or a nip roll on the following stage draw roll may be used to provide the pull necessary to orient in the following stage.

The first stage feed and draw rolls and the following stage heated roll and draw roll are desirably made from smooth or polished materials having a high-heat transfer capacity. Examples of such materials are polished plated steel, satin finished steel, and aluminum. Nip rolls are desirably made of smooth resilient materials such as rubber and plastic.

The first stage feed roll and following stage heated roll diameters will be correlated with film velocity and path to give sufficient contact time between the film and the respective rolls. The diameter of the following stage heated roll will also be correlated with the desired draw path. The following stage heated roll diameter will normally be at least about 3 in. The draw roll diameters of the first and subsequent stages are not critical.

Oil, steam, electricity or other acceptable means may be used to heat the first stage feed roll and following stage heated roll internally.

The polypropylene used in this process is usually at least 85 percent stereoregular and more usually at least 95 percent stereoregular. This polypropylene is essentially insoluble in refluxing heptane. The intrinsic viscosity of this polypropylene will generally be in the range of 2 –4 dl./g., more usually about 2–3 dl./g. (measured in decalin at 135° C.). Comparably its melt flow rate is in the range of about 0.1–12 g./10 minutes, more usually 2–10 g./10 minutes. (Measured by ASTM D 1238–57T, 2,160 grams load at 230° C.).

The polypropylene used in this invention may also contain minor portions of other resins, U.V. stabilizers, antioxidants, heat stabilizers, lubricants, dye acceptors, pigments, dyes and the like.

The attached drawing may help to better understand the process of this invention. It is a schematic side view of means by which polypropylene may be oriented uniaxially in two stages according to this invention. The first orientation stage involves rolls 2, 3, 4 and 5; the second stage involves rolls 6, 7, 8, 9 and 10.

The cast film 1 is passed between nip roll 2 and heated feed roll 3. As the film moves in contact with roll 3 it picks up heat. The film is stretched in the tangential gap between roll 3 and draw roll 5. The ratio of the peripheral speeds of roll 5 to roll 3 is about 2:1 5:1. Nip roll 4 is optional and will be used with high casting speed. By contact with roll 5 film 1 is cooled and stretching is terminated. From roll 5 film 1 passes to the second stage.

In the second stage the film is heated as it moves in contact with heated roll 7. Nip roll 6 is optional and will be used with high casting speeds. The film is drawn by the combined effect of draw roll 9 and nip roll 10. Draw roll 9 has a peripheral speed about 1.2 to five times that of roll 7. Nip roll 10 "anchors" the film against roll 9 so that it stretches the film. Nip roll 8 is optional and will be engaged for high-speed operation. Drawing occurs over the periphery of roll 7 as well as between roll 7 and roll 9. Film velocity measurements indicate that the majority of stretching in the second stage occurs while the film is in contact with roll 7.

The following examples also serve to illustrate specific embodiments of this invention.

EXAMPLE 1

Polypropylene (~95 percent insoluble in refluxing heptane) containing 1 wt. percent graphite was melted in a conventional extruder, extruded and cast at 10 feet per minute as a flat, thin film. The cast film was passed between a nip roll and a 3½ in. diameter feed roll heated internally to about 275° F. The film was drawn by a 3½ in. diameter draw roll to a draw ratio of about 3.2:1 Essentially adiabatic drawing occurred over the ~0.4 in. minimum tangential gap between the feed roll and draw roll.

From the draw roll the film was passed over a preheat roll internally heated to about 225° F. After the preheat the film was passed over a 3½ in. diameter roll heated internally to about 285° F. and having a peripheral speed of 32 feet per minute. The film was then drawn by a 3½ in. diameter draw roll having a peripheral speed of about 70 feet per minute—thus obtaining an ultimate draw ratio of about 7:1. The major portion of the drawing occurred while the film was in contact with the heated roll. The minimum tangential gap between the heated roll and draw roll was 1.35 in.

The resulting oriented film had a mean thickness of 1.2 mils. Its tensile strength (measured by drawing to break) was 58,600 p.s.i.

EXAMPLE 2

Using the general method described in example 1, cast polypropylene film was oriented uniaxially to an ultimate draw ratio of 7.6:1. The peripheral speed of the second-stage draw roll was 76 feet per minute instead of 70 feet per minute.

The resulting film had a means thickness of 1.3 mils and a tensile strength of 60,600 p.s.i.

EXAMPLE 3

Using the general method of example 1 with polypropylene containing no graphite, cast film was oriented to an ultimate draw ratio of 8.0:1. The peripheral speed of the first-stage draw roll was 40 feet per minute instead of 32 feet per minute and the second-stage draw roll peripheral speed was 80 feet per minute rather than 76 feet per minute.

The oriented film had a mean thickness of 1.0 mils and a tensile strength of 68,200 p.s.i.

EXAMPLE 4

By the general method of example 1 cast polypropylene film was oriented uniaxially to an ultimate draw ratio of 9.5:1. As compared to the peripheral speeds of example 1, the first-stage draw roll was run at 40 feet per minute and the second-stage draw roll was run at 95 feet per minute. The oriented film had a mean thickness of 1.5 mils and a tensile strength of 71,500 p.s.i.

EXAMPLE 5

By the general method of example 1, but with the first-stage feed roll and second-stage heated roll each replaced with 6 in. diameter rolls, polypropylene film cast at 30 feet per minute was oriented uniaxially to an ultimate draw ratio of 7.6:1. As compared to the peripheral speeds of example 1, the first-stage draw roll was run at 96 feet per minute and the second-stage draw roll was run at 228 feet per minute. Also, temperature of the preheat roll was 249° F. rather than 225° F.

EXAMPLE 6

By the method of example 5 polypropylene film cast at 50 feet per minute was oriented uniaxially to an ultimate draw ratio of 7.6:1. As compared to the peripheral speeds of example 5 the first-stage draw roll was run at 160 feet per minute and the second-stage draw roll was run at 380 feet per minute.

EXAMPLE 7

Comparison runs were made in which polypropylene film was cast at 30 feet per minute and oriented in a single stage to draw ratios of 6:1 and 6.5:1. The apparatus used in this single stage orientation was essentially the same as that described as the second stage apparatus in example 5. At a draw ratio of 6:1 occasional lateral film breaks occurred. At 6.5:1 frequent lateral film breaks occurred causing numerous interruptions in the film production.

EXAMPLE 8

Polypropylene film was cast at 18 feet per minute and oriented in three stages to an ultimate draw ratio of about 12:1. The apparatus used in this three-stage orientation was that of example 5 with the addition of another set of rolls identical to those used on the second stage of example 5. The temperature of the third stage heated roll was 301° F. The peripheral speeds of the driven rolls on each stage were: first—83 feet per minute; second—153 feet per minute; third—224 feet per minute.

The films made by this invention may be used in the manufacture of cordage products, such as twines, textiles and other like products.

As will be evident to those skilled in the art, various modifications on this invention can be made or followed, in the light of the foregoing disclosure and discussion, without departing from the spirit or scope of the disclosure or from the scope of the following claims.

I claim:

1. A process for orienting stereoregular polypropylene film uniaxially in the longitudinal direction to an ultimate draw ratio in the range 6:1 up to 13:1 in two or more successive orientation stages which consists of:

in the first orientation stage passing cast film about 2.0 to 20 mils thick between a nip roll and a feed roll having a temperature between about 200° and 280° F., the contact time of the film and feed roll being sufficient to heat the film to within at least about 10° F. of the feed roll temperature and drawing the film through about a 0.2 to 3 in. long linear path defined by the minimum tangential gap between the feed roll and a first draw roll having a peripheral speed about two to five times that of the feed roll so as to draw the film adiabatically, and in at least one additional orientation stage drawing the film to said ultimate draw ratio over a heated roll and between said heated roll and a draw roll so as to effect drawing over a partially arcuate path defined by the arc over which the film stretches in contact with the heated roll and the minimum tangential gap between the heated roll and the draw roll, the major portion of said drawing occurring over said arc wherein said drawing is isothermal, the heated roll having a temperature between about 260° and 320° F. and a peripheral speed substantially equal to that of the draw roll of the preceding orientation stage, said draw roll having a peripheral speed greater than that of the heated roll and the contact time of the film and heated roll being sufficient to heat the film to within at least about 10° F. of the heated roll temperature.

2. A process for orienting stereoregular polypropylene film uniaxially in the longitudinal direction to an ultimate draw ratio in the range of 6:1 up to 13:1 in two or more successive orientation stages which consists of:

in the first orientation stage passing cast film about 2.0 to 20 mils thick at a speed of at least about 40 feet per minute between a nip roll and a feed roll having a temperature between about 260° and 280° F., the contact time of the film and feed roll being sufficient to heat the film to within at least about 10° F. of the feed roll temperature and drawing the film through about a 0.2 to 3 in. long linear path defined by the minimum tangential gap between the feed roll and a first draw roll having a temperature of about 50°–200° F. and a peripheral speed about two to five times that of the feed roll as to draw the film adiabatically, and in at least one additional orientation stage drawing the film to said ultimate draw ratio over a heated roll and between said heated roll and a draw roll so as to effect drawing over a partially arcuate path of at least about 6 inches long on a linear basis defined by the arc over which the film stretches in contact with the heated roll and the minimum tangential gap between the heated roll and the draw roll, the major portion of said drawing occurring over said arc wherein said drawing is isothermal, the heated roll having a temperature between about 260° and 320° F. and a peripheral speed substantially equal to that of the draw roll of the preceding orientation stage, said draw roll having a peripheral speed greater than that of the heated roll and a temperature of about 50°–200° F. and the contact time of the film and heated roll being sufficient to heat the film to within at least about 10° F. of the heated roll temperature.

3. The process of claim 2 wherein there is only one additional orientation stage and the peripheral speed of the draw roll in the additional orientation stage is about 1.2 to five times that of the heated roll.

4. The process of claim 2 wherein the ultimate draw ratio is about 8:1, the peripheral speed of the first draw roll is about four times that of the feed roll and the peripheral speed of the draw roll of the additional orientation stage is about two times that of the heated roll.

5. The process of claim 2 wherein the temperature of the heated roll is between about 260° and 295° F.

6. The process of claim 2 wherein there are two additional orientation stages.

* * * * *